US009298695B2

(12) United States Patent
Hochman et al.

(10) Patent No.: US 9,298,695 B2
(45) Date of Patent: Mar. 29, 2016

(54) METHOD AND APPARATUS FOR MANAGING AUTO-CORRECTION IN MESSAGING

(71) Applicants: AT&T Mobility II, LLC, Atlanta, GA (US); AT&T Intellectual Property I, LP, Atlanta, GA (US)

(72) Inventors: Kevin Hochman, Norman, OK (US); Glenn Blumstein, Mercer Island, WA (US); Ginger Chien, Bellevue, WA (US)

(73) Assignees: AT&T Intellectual Property I, LP, Atlanta, GA (US); AT&T Mobility II LLC, Atlanta, GA (US)

( * ) Notice: Subject to any disclaimer, the term of this patent is extended or adjusted under 35 U.S.C. 154(b) by 232 days.

(21) Appl. No.: 14/018,540

(22) Filed: Sep. 5, 2013

(65) Prior Publication Data

US 2015/0067486 A1     Mar. 5, 2015

(51) Int. Cl.
G06F 17/00      (2006.01)
G06F 17/27      (2006.01)

(52) U.S. Cl.
CPC ............................. *G06F 17/273* (2013.01)

(58) Field of Classification Search
CPC ................................................... G06F 17/243
See application file for complete search history.

(56) References Cited

U.S. PATENT DOCUMENTS

| 4,830,618 | A * | 5/1989 | David | G06F 17/273 715/256 |
| 6,948,136 | B2 | 9/2005 | Trewin | |
| 7,036,075 | B2 | 4/2006 | Walker | |
| 7,404,143 | B2 * | 7/2008 | Freelander | G06F 17/273 715/256 |
| 7,574,348 | B2 * | 8/2009 | Hon | G06F 17/273 704/4 |
| 7,937,445 | B2 | 5/2011 | Vincent | |
| 8,136,050 | B2 | 3/2012 | Sacher et al. | |
| 8,201,087 | B2 | 6/2012 | Kay et al. | |
| 8,225,203 | B2 | 7/2012 | Unruh | |

(Continued)

FOREIGN PATENT DOCUMENTS

| AU | 2011205131 A1 | 8/2011 |
| WO | 2010094626 A1 | 8/2010 |

OTHER PUBLICATIONS

"Text Assist for webOS, an autocorrection software that vibrates or emits a sound and underlines a word that has been autocorrected", http://www.webosnation.com/using-text-assist-autocorrect-webos-2-0, 2013, 10 pages.

(Continued)

*Primary Examiner* — Keith Bloomquist
(74) *Attorney, Agent, or Firm* — Guntin & Gust, PLC; Ed Guntin

(57) ABSTRACT

A system that incorporates the subject disclosure may include, for example, detecting in a corrected text message an auto-correction by the first communication device of a target word of a group of words, detecting an input command requesting a transmission of the corrected text message to a second communication device, responsive to the detecting of the input command, presenting a correction alert indicating the target word that has been auto-corrected, and in response to the presenting of the correction alert, presenting an option for modifying the target word, where the transmission of the corrected text message to the second communication device is limited to after the option for modifying is presented at the first communication device. Other embodiments are disclosed.

20 Claims, 7 Drawing Sheets

(56) References Cited

U.S. PATENT DOCUMENTS

| | | |
|---|---|---|
| 8,416,193 B2 | 4/2013 | Miller |
| 8,452,584 B2 * | 5/2013 | Fux .................... G06F 17/2735 715/257 |
| 8,466,896 B2 | 6/2013 | Stephanick et al. |
| 2004/0153963 A1 | 8/2004 | Simpson et al. |
| 2005/0278413 A1 * | 12/2005 | Tannenbaum ................ 709/202 |
| 2011/0201387 A1 | 8/2011 | Paek et al. |
| 2013/0104068 A1 | 4/2013 | Murphy et al. |
| 2013/0151956 A1 * | 6/2013 | Allen ........................... 715/256 |
| 2013/0211821 A1 * | 8/2013 | Tseng et al. ..................... 704/9 |

OTHER PUBLICATIONS

Brewster, Stephen et al., "Tactile Feedback for Mobile Interactions", ACM, CHI 2007, 2007, 4 pages.

Hoffmann, Alexander et al., "TypeRight: a Keyboard with Tactile Error Prevention", ACM, 2009, 4 pages.

Hoggan, Eve et al., "Investigating the Effectiveness of Tactile Feedback for Mobile Touchscreens", ACM, Apr. 2008, 10 pages.

* cited by examiner

METHOD AND APPARATUS FOR MANAGING AUTO-CORRECTION IN MESSAGING

FIELD OF THE DISCLOSURE

The subject disclosure relates to a method and apparatus for managing auto-correction in messaging.

BACKGROUND

Text messaging is a popular form of communication between users of communication devices. Text messaging can often involve messages that are generated rather quickly leading to errors. Efforts to correct the errors have been employed by messaging applications that spell check the entered words. However, spell checking and replacement of target words can be inaccurate.

BRIEF DESCRIPTION OF THE DRAWINGS

Reference will now be made to the accompanying drawings, which are not necessarily drawn to scale, and wherein.

DETAILED DESCRIPTION

Figures 1A, 1B:
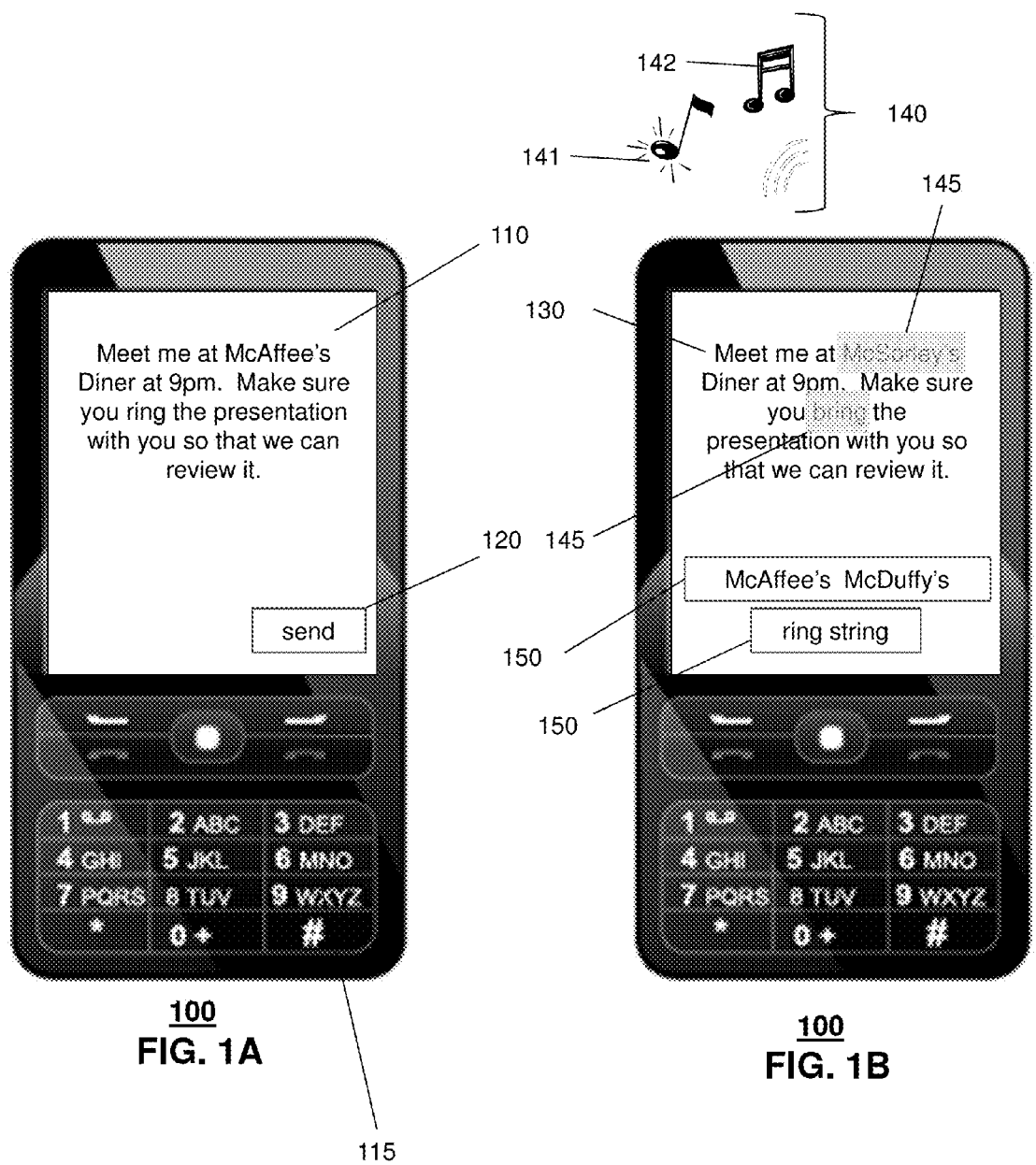
FIGS. 1A and 1B depict an illustrative embodiment of a communication devices for sending messages.

The subject disclosure describes, among other things, illustrative embodiments of providing alerts for auto-corrected words in a text message. Other embodiments are included in the subject disclosure.

One embodiment of the subject disclosure is a method comprising receiving, at a first communication device including a processor, input data comprising a group of words inputted via a user interface of the first communication device. The method can include performing, by the first communication device, auto-correction of a target word of the group of words to generate a corrected text message; and receiving, at the first communication device, an input command via the user interface, the input command requesting a transmission of the corrected text message to a second communication device. The method can include responsive to the receiving of the input command, presenting a correction alert at the first communication device, the correction alert indicating the target word that has been auto-corrected; and in response to the presenting of the correction alert, presenting, by the first communication device, an option for modifying the target word. The transmission of the corrected text message to the second communication device is limited to after the option for modifying is presented at the first communication device.

One embodiment of the subject disclosure includes a computer-readable storage device comprising computer instructions which, responsive to being executed by a processor of a first communication device, cause the processor to perform operations comprising detecting in a corrected text message an auto-correction by the first communication device of a target word of a group of words. The operations can include detecting an input command requesting a transmission of the corrected text message to a second communication device; and responsive to the detecting of the input command, presenting a correction alert indicating the target word that has been auto-corrected. The operations can include, in response to the presenting of the correction alert, presenting an option for modifying the target word. The transmission of the corrected text message to the second communication device is limited to after the option for modifying is presented at the first communication device.

One embodiment of the subject disclosure includes a method comprising receiving, at a first communication device, provisioning information indicating types of alerts to be applied for contact entries stored by the first communication device. The method can include detecting, by the first communication device, an auto-correction in a corrected text message of a target word of a group of words; and detecting, at the first communication device, an input command requesting a transmission of the corrected text message to a second communication device. The method can include, responsive to the detecting of the input command, presenting a correction alert indicating the target word that has been auto-corrected. The presenting of the correction alert can be according to a type of alert of the provisioning information that corresponds to the second communication device.

FIG. 1A depicts an illustrative embodiment of a mobile communication device 100 that can be utilized for sending text messages, such as a Short Message Service (SMS) message. Communication device 100 is depicted as a mobile communication device, however, the exemplary embodiments can be various types of communication devices, such as tablets, desktop computers, set top boxes, and so forth, and can communicate via wireless and/or hardwired methods. Device 100 enables a user to enter a text message 110 by way of user interface 115 which is depicted as a keyboard. Device 100 can also provide user interfacing through other means, such as a touch-screen user interface, voice commands, and so forth.

In one embodiment, auto-correction can be implemented at the device 100 for corrections to be made to target words in the original message 110. The type of auto-correction employed can vary. For example, the auto-correction can provide a suggested alternative word when a potential error is detected. This example of auto-correction can present the alternative word in a blow-up or cloud in proximity to the target word and allow for the user to select the auto-correction. As another example, auto-correction can be employed without requiring user confirmation of the alternative word. In such an example, changes can be made to target words, such as based on a probability of the alternative word being accurate. Factors such as subject matter of the message, sentence structure, previous usage of the word by the user in other text messages, and so forth can be considered in the auto-correction process. In one embodiment, one or more difference libraries can be employed by the auto-correction process. The selection of a library can be based on a number of different factors, such as subject matter of the message, identity of the sender, identity of the recipient, user preference, monitored history of relevancy of a library for the sender, recipient and/or subject matter, and so forth.

In the illustrated embodiment, the original message 110 includes target words "McAffee's" and "ring." Referring to FIG. 1B, auto-correction has been applied and the target words have been changed to "McSorley's" and "bring", respectively, in the corrected message 130. In one embodiment, responsive to the user depressing the send button or otherwise requesting transmission of the text message, a correction alert can be presented by the device 100. The correction alert can be in various formats or combinations of formats, such as audio and/or graphical alerts. In this example, an audio alert 140 can be emitted, responsive to the request for transmission, to notify the user that an auto-correction of the original message 110 has occurred. For instance, device 100 can play a first audio signal 141 representing the first auto-correction (e.g., "McSorley's") and can play a second audio signal 142 representing the second auto-correction (e.g., "bring"). In one embodiment, the type of audio signal can correspond to the type of word being corrected. For instance, names can correspond to the first audio signal while verbs correspond to the second audio signal. Other categorization of words and their corresponding audio signals can also be utilized, such as prepositions having a third audio signal and so forth. While this exemplary embodiment utilizes different audio signals for the audio alert 140, one or more of the exemplary embodiments can utilize the same audio alert which may be emitted once for all of the auto-corrections or emitted in series for each of the auto-corrected words. The audio signals can be selected by the user and/or can be selected by the device 100, such as from a default setting or user preferences as to other ringtones or sounds.

In this example, a graphical alert 145 can be presented in conjunction with the audio alert 140. For instance, the graphical alert 145 can be a highlighting of the target word(s) or another type of graphics placed in proximity to the target word(s) so that the user can easily identify the words that have been corrected. Similar to the audio alert 140, the type of graphical alert 145 (e.g., the color of highlighting or the symbol utilized) can correspond to the type of word being corrected. For instance, names can correspond to the first graphical alert color while verbs correspond to the second graphical alert color. Other categorization of words and their corresponding graphics can also be utilized, such as prepositions having a third graphical alert color and so forth. One or more of the exemplary embodiments can also utilize the same graphics (e.g., the same color highlighting) for each of the auto-corrected words. The graphics (e.g., highlight colors and/or symbols) can be selected by the user and/or can be selected by the device 100, such as from a default setting or user preferences as to other background colors, symbols and so forth.

In one embodiment, the device 100 can provide the original version of the target word (e.g., "McAffee's" and "ring") and/or can provide alternative versions of the word (e.g., "McDuffy's" and "string"), such as in a pop-up window 150. The window 150 can be interactive such that it allows for selection of the original and/or alternative version to replace the target words shown in the corrected message 130. In one embodiment, the alternative target word(s) in window 150 can be obtained from different word libraries. For example, the auto-correction for message 110 can be performed utilizing a first library that has been associated with an intended recipient of the message (e.g., a family member). However, the device 100 can search through other libraries that are associated with other contacts (e.g., friends or co-workers) for other alternative target words. The other libraries can be stored locally and/or can be stored remotely, such as at a messaging server. In one embodiment, libraries for auto-correction are generated based on monitoring messages that are created at the device 100, such as storing names of places as they are included in messages. Other techniques for building libraries can also be utilized by the device 100, such as importing words from a database.

Figure 2:
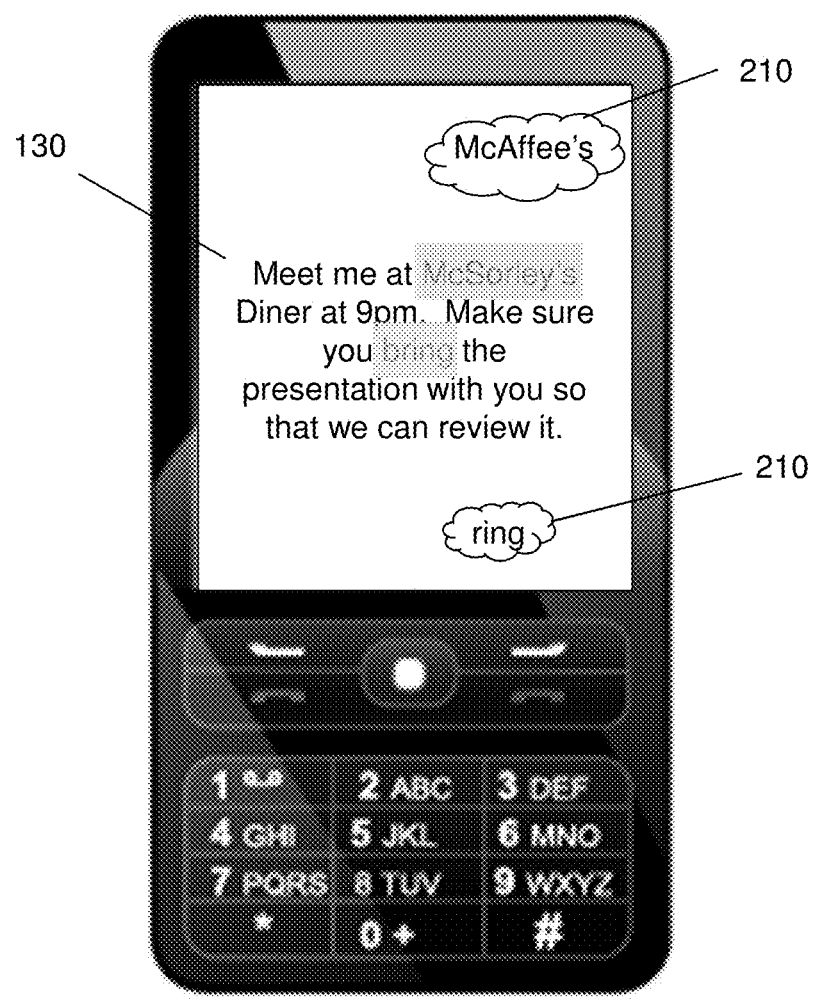
FIG. 2 depicts an illustrative embodiment of a communication device for receiving messages sent by the communication device of FIG. 1.

Referring additionally to FIG. 2, a recipient communication device 200 is illustrated in which the corrected message 130 is received from device 100. Device 200 can receive a recipient alert to be presented by the device to indicate that the message 130 has been corrected. For example, the recipient alert can be highlighting or other graphics to point out the corrected target words (e.g., "McSorley's" and "bring"). In one embodiment, pop-up windows 210 can be presented to indicate the original version of the target word(s). In one embodiment, the recipient alert can be the same as the correction alert presented at device 100, such as the audio alert 140 or the graphical alert 145. In another embodiment, the recipient alert and the correction alert can be of different formats, such as the correction alert being a highlighting of the target words while the recipient alert is an audio alert with original versions shown in windows 210. Similar to the correction alert, the recipient alert can be of various formats and can be generated based on various techniques, such as selecting a color of highlighting based on a type of word or selecting an audio signal based on an identity of the sender.

The recipient alert can be provided with the transmitted message and/or can be provided in a separate data transmission. In one embodiment, the selection of the type of recipient alert can be based on a number of different factors including the capabilities of the recipient device and/or the size of the message being transmitted. For instance, a device 100 can detect that a message is at or near the maximum character length and can provide the recipient alert as a separate data transmission after the message is transmitted. In this example, the recipient alert can be an audio alert with original versions of the target words being presented in the windows 210. In another example, the device 100 can include the recipient alert with the message where the message is a relatively short message. The recipient alert can include highlighting of the target word(s) and presentation of the original versions of the target words in windows 210. In one embodiment, the recipient device 200 can provide its own alternative versions of the target word(s), such as based on one or more libraries stored at the recipient device. In one embodiment, a protocol can be defined or otherwise implemented that conveys an alert logically rather than literally, leaving choice of the format of the recipient alert up to the best efforts of the recipient device 200. The recipient device 200 can apply a first format selected by the sending device to the recipient alert but is also permitted to fall back to its best-available substitute second format if it is unable to or it is not preferred to present the first format. In one embodiment, logical recipient alerts can be utilized such as a localized visual alert within the affected content, else a generic audible alert (e.g., correction information available in a drill down menu). Other recipient alerts can be very specific literal and formatted alerts such as highlight autocorrected text in yellow in which case a determination of compatibility may be important if the protocol design does not permit for any fallback representation or if the protocol design does permit for fallback but also allows the sender to be strictly specific and disable a fallback behavior.

In one embodiment, the recipient alert can provide notice to the recipient that the message 130 includes corrected target words and can provide the recipient device 200 with access to the original versions of the target word(s). The access can be local, as described above in the examples, or the access can be remotely, such as via a messaging server and/or from the device 100. For example, the recipient alert can enable a recipient user to request the original version of the word and then in response to the request, the messaging server and/or the device 100 can transmit the original version of the target word(s) to the device 200.

Figure 3:
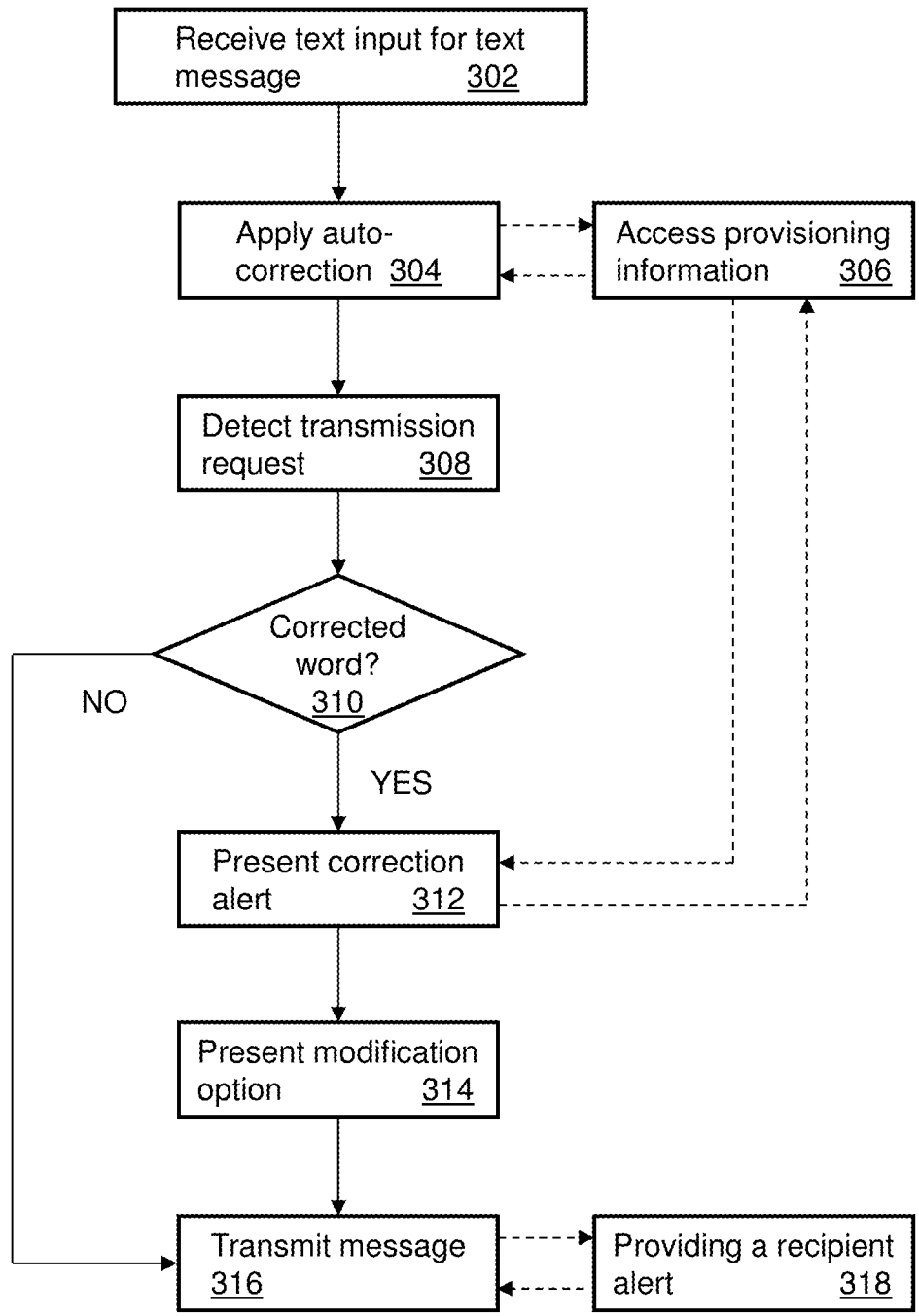
FIG. 3 depicts an illustrative embodiment of a method operating in portions of the devices of FIGS. 1A-2.

FIG. 3 depicts an illustrative embodiment of a method used by a communication device, such as device 100. Method 300 can begin at 302 with a user entering text to generate a text message. The text can be input via a user interface, such as a keyboard or by way of other techniques, such as voice-to-text recorder and converter. At 304, auto-correction can be applied to the message. The application of auto-correction can be while the message is being generated, such as via suggested spellings in pop-up windows, automatic replacement of misspelled words or other means including a spell check at the end of generating the message. The auto-correction can also be based on one or more libraries that are locally and/or remotely stored (e.g., at a messaging server). In one embodiment at 306, the auto-correction can be based on provisioning information stored at the device 100 and/or stored remotely (e.g., at a messaging server). The provisioning information can include a level of auto-correction to be implemented, such as a selection of libraries to be employed, a number of alternative spellings to be suggested, types of words to be analyzed, whether historical information (e.g., previous auto-corrections or previously generated messages) is to be utilized, and so forth. In one embodiment, the provisioning information can be associated with recipients (and/or recipient devices) and/or associated with types of messages (e.g., based on subject matter). For example, the device 100 can detect that a message is intended for a co-worker (e.g., based on identification of the recipient and/or based on an analysis of the subject matter of the message) and can select a library that is applicable to work-based emails. In another embodiment, information (e.g., dictionaries, rules, recipient preferences and so forth) can be accessed based on changes to recipient lists in a chain of text messages. For example, if another person is added to the list of recipients that would change the least-common denominator choice of acceptable words or other instructions found in provisioning information. In this example, provisioning data can be adjusted dynamically during the course of message composition. In one example, all of the dictionaries for all possible known recipients can be accessible by the sending device, but for a completely unknown party, where there is no tailored dictionary or rules for that person, the sending device can pull that information from the cloud (e.g., via the cloud from a dictionary or preferences stored on the recipient's device or in a cloud storage for the recipient device). The provisioning data can be context-sensitive such as would be affected by the destination party (e.g., no profanities in a message directed to family members).

At 308, a transmission request (e.g., the user depressing the "send" button) can be detected by the device 100 which triggers an analysis of the message for any auto-corrected words at 310. If no auto-corrected words exist then method 300 can proceed to 316 to transmit the message. If on the other hand, auto-corrected words are detected in the message then at 312 a correction alert can be presented by the device 100. It should be understood that the auto-correction of the target words can be automatic (e.g., without user interaction) and/or can be based on user input. The correction alert can be in various formats or combinations of formats, including audio alerts and graphic alerts.

In one embodiment, the detection of the auto-corrected target word(s) and the presentation of the correction alert(s) can be performed by an application that is separate from the text messaging application that implements the auto-correction. In another embodiment, the text messaging application that performs the auto-correction can also present the correction alert. In one embodiment, the device 100 can access the provisioning information at 306 for selection of the correction alert, such as selecting a particular audio alert indexed to the intended recipient of the message or indexed to a subject matter of the message or indexed to a type of word that has been corrected. At 314, a modification option for the target word(s) can be presented. The modification option can include the original version of the target word(s) and/or alternative target word(s). The modification option can be a pop-up window or other GUI that enables the use to select the alternative or original version of the target word.

In one embodiment, after the modification alert has been presented and acknowledged by the user (e.g., by selecting the original version, by selecting the alternative version or by maintaining the auto-corrected version), the message can be transmitted at 316. In one embodiment, a recipient alert can be provided at 318. The recipient alert can be included with the transmitted message or can be sent in a separate transmission. The recipient alert can be presented by the recipient device 200 to notify the recipient that the message includes auto-corrected words. In one or more embodiments, the recipient alert can enable local and/or remote access to the original version of the target word(s). For instance, the recipient alert can include presenting the original version of the target word(s) in a pop up window or can provide a link to access the original version of the target word(s) such as at a messaging server or at the device 100. In another embodiment, in order to reconstruct the original message in the presence of the recipient notification of correction, an original version can be transmitted to the recipient device 200 along with instructions on what the chosen substitution was. In this example, various compression and/or efficient representational models can be used to convey the original and corrected versions, including literal before and after text paired with a range of characters over which a substitute string of text was applied, delta approaches where only the materially different characters are sent with the needed positional information, and so forth. In another embodiment, a distributed system can be implemented so that a number of the functions described in method 300 or elsewhere with respect to the exemplary embodiments can be performed by different devices. For instance, a sending communication device can detect an auto-correction while a remote server can provide libraries correlated to a receiving device for suggestions as to alternative words. The distributed system can be a dynamic system that changes based on device capabilities, such as the remote server performing all functions for method 300 that the sending device is unable to perform due to device capabilities. The distributed system can also change over time such as moving functions over time between devices, (e.g., from the end user device to the cloud) as needs or options dictate.

In one or more embodiments, portions of method 300 or other techniques described with respect to the exemplary embodiments can be performed by one or more remote servers, such as in a cloud computing environment. In this example, the end use devices may do as little as merely displaying the compositional user interface. In other words, the in-work draft message, the dictionary retrievals and processing, and/or other intelligence can all be performed in the cloud while the communication device(s) is only displaying a representation of the message and accepting user input.

Figure 4:
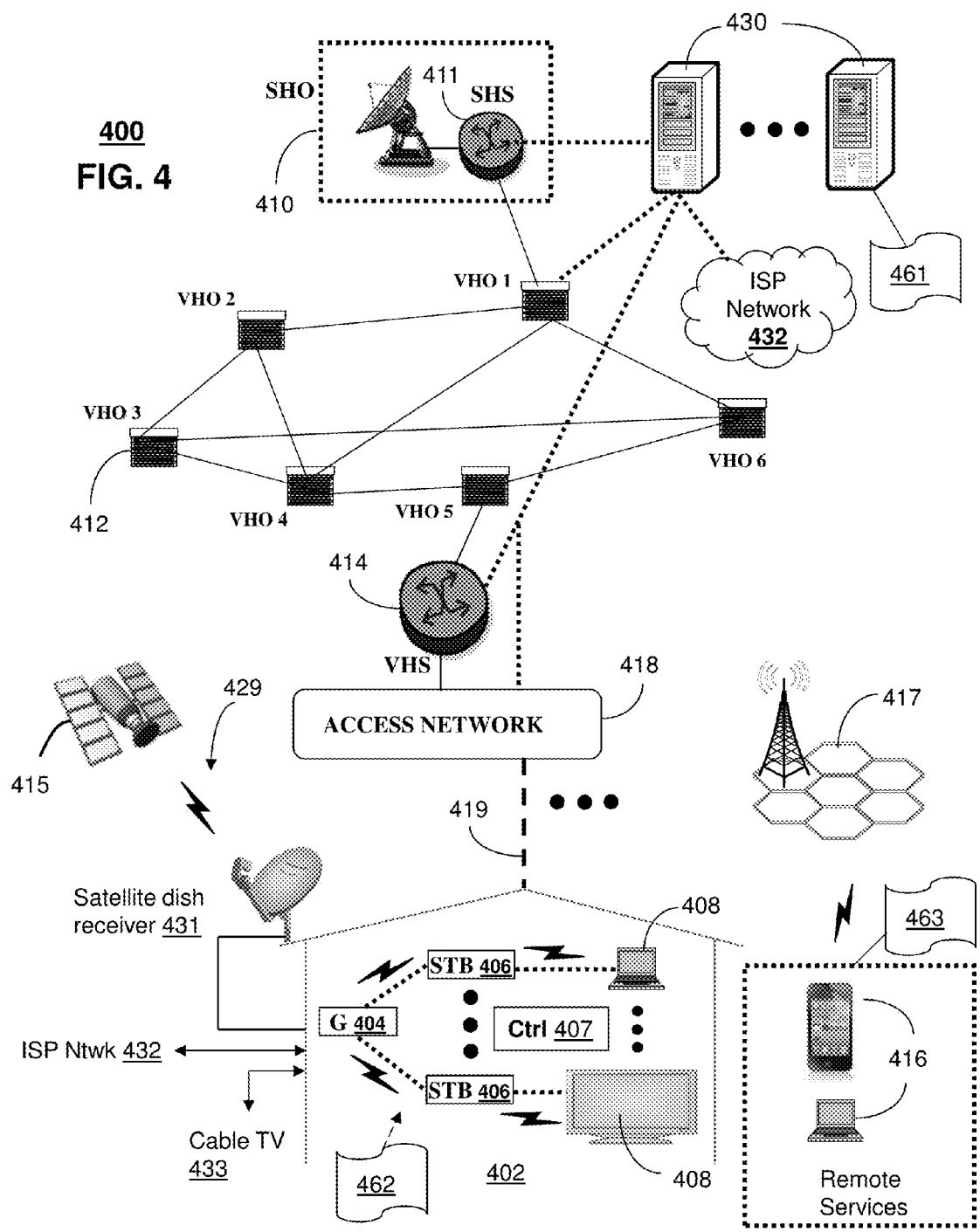
FIGS. 4-5 depict illustrative embodiments of communication systems that provide media services including messaging.

FIG. 4 depicts an illustrative embodiment of a first communication system 400 for delivering media content. The communication system 400 can represent an Internet Protocol Television (IPTV) media system. Communication system 400 can be overlaid or operably coupled with the devices 100 and 200 of FIGS. 1 and 2 as another representative embodiment of communication system 400. System 400 enables presenting a correction alert at a first communication device where the correction alert indicates the target word that has been auto-corrected, and presenting an option for modifying the target word. The transmission of the corrected text message to the second communication device can be limited to after the option for modifying is presented at the first communication device.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system. Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a messaging server (herein referred to as server 430). The server 430 can use computing and communication technology to perform function 461, which can include among other things, enabling access by a recipient communication device to the original version of the target word, providing access to provisioning information, and/or providing access to auto-correction libraries. The media processors 406 and wireless communication devices 416 can be provisioned with software functions 462 and 463, respectively, to utilize the services of server 430, as well as to perform the steps of method 300 including presenting the correction alert or the recipient alert.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
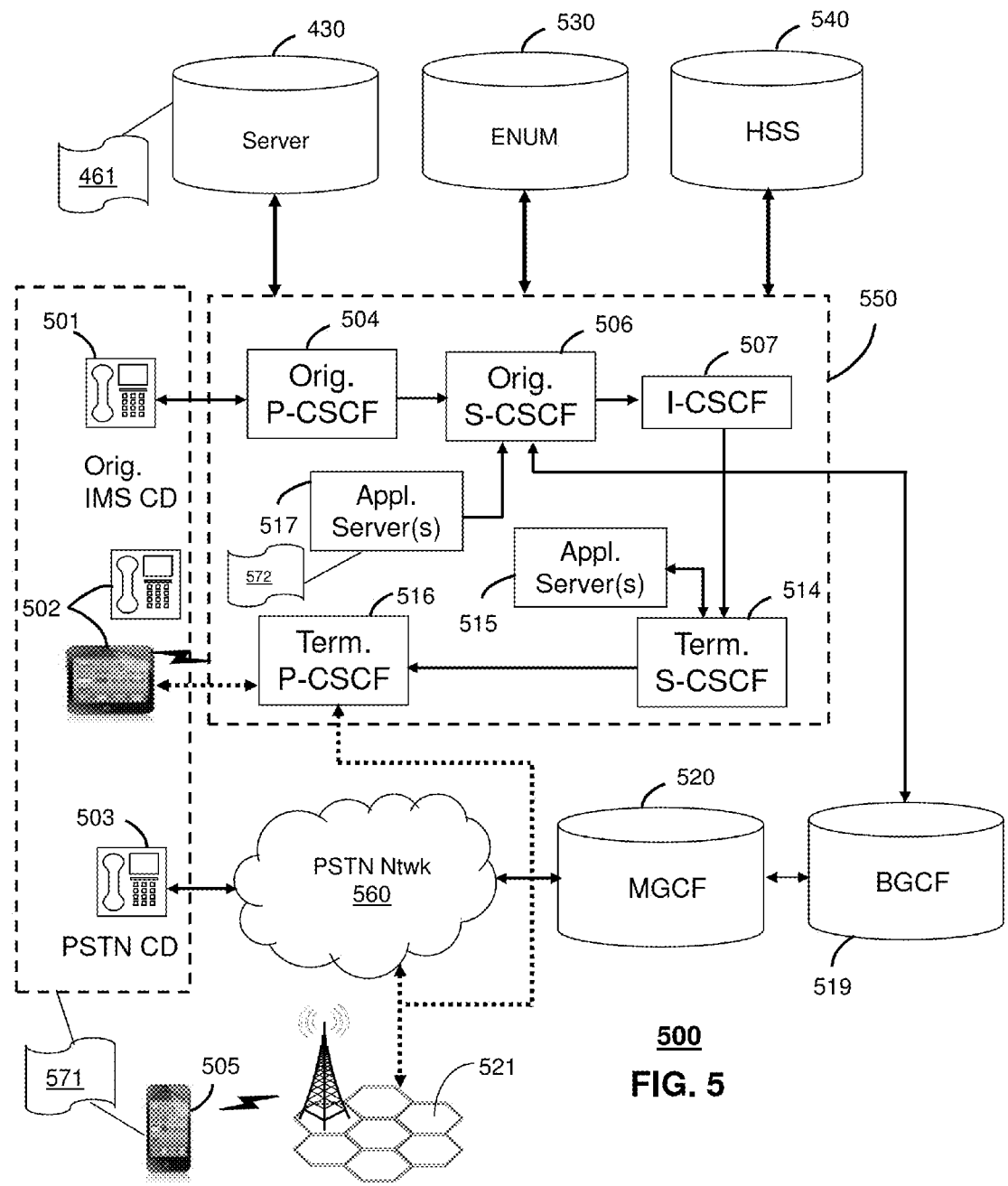

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with devices 100 and 200 and communication system 400 as another representative embodiment of communication system 400. System 500 enables detecting in a corrected text message an auto-correction by the first communication device of a target word of a group of words, detecting an input command requesting a transmission of the corrected text message to a second communication device, presenting a correction alert indicating the target word that has been auto-corrected, and presenting an option for modifying the target word. The transmission of the corrected text message to the second communication device can be limited to after the option for modifying is presented at the first communication device.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. Server 430 can perform function 461 and thereby provide messaging services to the CDs 501, 502, 503 and 505 of FIG. 5. CDs 501, 502, 503 and 505, which can be adapted with software to perform function 571 to utilize the services of the server 430. Server 430 can be an integral part of the application server(s) 517 performing function 572, which can be substantially similar to function 461 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
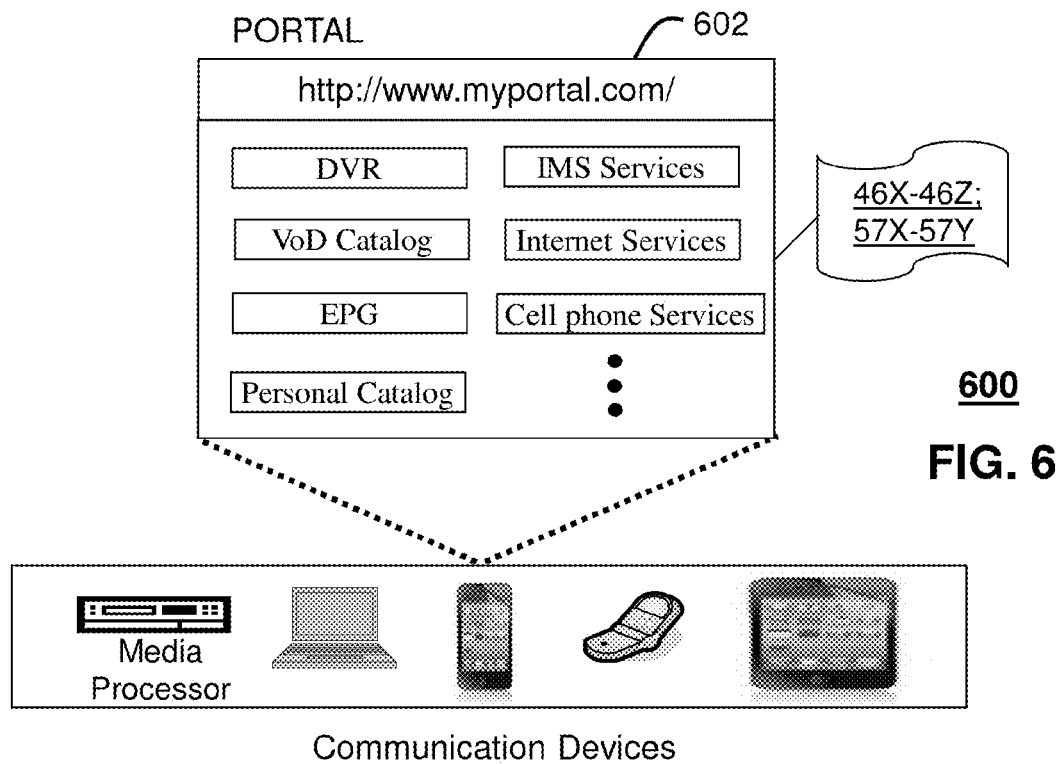
FIG. 6 depicts an illustrative embodiment of a web portal for interacting with the communication device of FIG. 1.

FIG. 6 depicts an illustrative embodiment of a web portal 602 which can be hosted by server applications operating from the computing devices 430. Communication system 600 can be overlaid or operably coupled with devices 100 and/or 200, communication 400, and/or communication system 500. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 461-463, and 571-572 to adapt these applications as may be desired by subscribers and service providers of communication systems 400-500. Web portal 602 can be used for providing provisioning information associated with the auto-correction and/or the correction/recipient alert(s). For example, the web portal can be used to upload audio tones that are to be utilized for different contact entries in a stored contact book. In another embodiment, graphics (e.g., highlighting colors) can be designated based on types of words, such as names, verbs, prepositions, and so forth.

Figure 7:
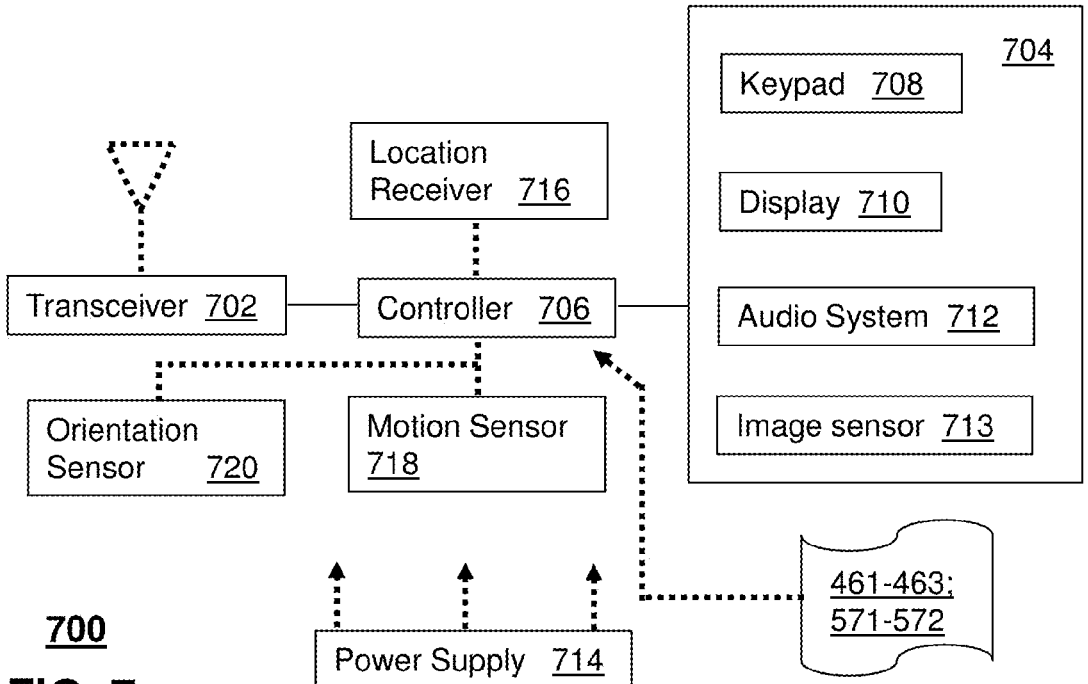
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 4-5, as well as devices 100, 200. Device 700 can receive provisioning information indicating types of alerts to be applied for contact entries stored by the first communication device, detecting an auto-correction in a corrected text message of a target word of a group of words, detecting an input command requesting a transmission of the corrected text message to a second communication device, and presenting a correction alert indicating the target word that has been auto-corrected. The presenting of the correction alert can be according to a type of alert of the provisioning information that corresponds to the second communication device.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. Other reset components or techniques can also be utilized such as pressing and holding multiple (e.g., 2 or 3) designated hard-buttons simultaneously for a pre-determined time period or menu-accessible master reset commands. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices 100, 200 of FIGS. 1 and 2], communication system 400, and communication system 500. In addition, the controller 706 can be adapted in various embodiments to perform the functions 461-463 and 571-572, respectively.

Upon reviewing the aforementioned embodiments, it would be evident to an artisan with ordinary skill in the art that said embodiments can be modified, reduced, or enhanced without departing from the scope of the claims described below. For example, the recipient communication device 200 can determine words that have been auto-corrected based on metadata included with the text message and/or can present a recipient alert according to recipient preferences (e.g., included in provisioning information stored at the recipient device). Other embodiments can be used in the subject disclosure. It should be further understood that the exemplary embodiments can be applied to various messages including single word messages, multi-word messages, messages including graphics, and so forth.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
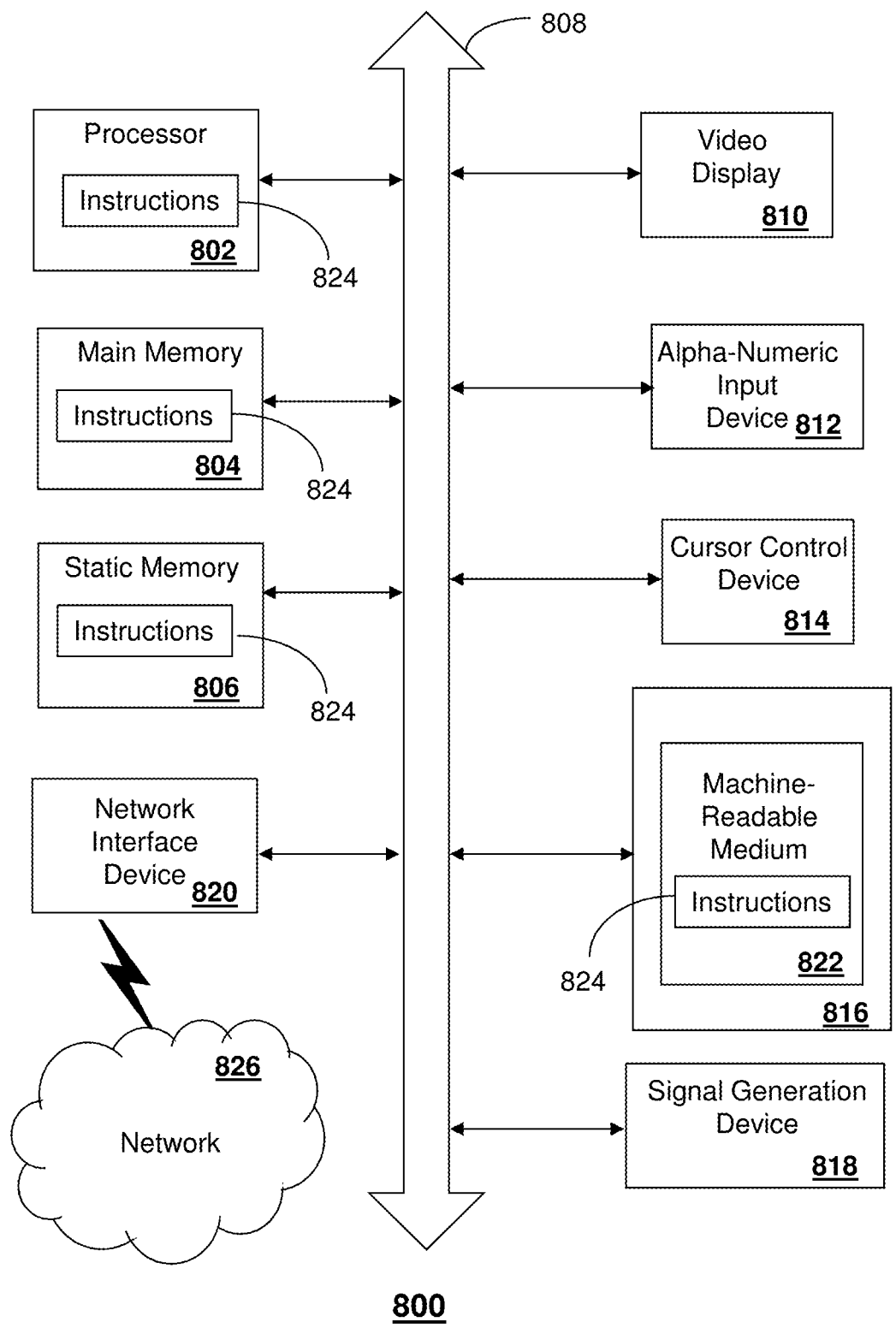
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the device 100, the device 200, the server 430, and other devices or systems described herein. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. Other input components can also be included, such as a touchscreen. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    receiving, at a first communication device including a processor, input data comprising a group of words inputted via a user interface of the first communication device, the group of words comprising a target word having a type;
    performing, by the first communication device, auto-correction of the target word to generate a corrected text message;
    receiving, at the first communication device, an input command via the user interface, the input command requesting a transmission of the corrected text message to a second communication device;
    responsive to the receiving of the input command, presenting a correction alert at the first communication device, the correction alert indicating the target word that has been auto-corrected; and
    in response to the presenting of the correction alert, presenting, by the first communication device, an option for modifying the target word,
    wherein the transmission of the corrected text message to the second communication device is limited to after the option for modifying is presented at the first communication device, and
    wherein a type of the correction alert corresponds to the type of the target word.

2. The method of claim 1, comprising:
    receiving, at the first communication device, provisioning information via the user interface, the provisioning information indicating types of alerts and a level of auto-correction to be applied for the second communication device; and
    storing, by the first communication device, the provisioning information in a memory of the first communication device indexed to the second communication device,
    wherein the receiving and storing of the provisioning information is prior to the receiving of the input data comprising the group of words, and wherein the performing of the auto-correction and the presenting of the correction alert are according to the provisioning information.

3. The method of claim 2, comprising providing, by the first communication device, a recipient alert with the transmission of the corrected text message to the second communication device, wherein the recipient alert is configured for presentation at the second communication device to indicate the target word that has been auto-corrected, wherein the recipient alert enables the second communication device to remotely access an unmodified version of the target word from a messaging server that is remote from the first communication device, and wherein the types of alerts indicate at least one of audio or graphical alerts corresponding to types of words being corrected.

4. The method of claim 1, wherein the auto-correction of the target word is based on a first library, and wherein the option for modifying the target word includes presenting a suggested word from a second library.

5. The method of claim 1, wherein types of target words include names and verbs and wherein the names and verbs respectively correspond to different types of correction alerts.

6. The method of claim 1, comprising providing, by the first communication device, a recipient alert with the transmission of the corrected text message to the second communication device, wherein the recipient alert is configured for presentation at the second communication device to indicate the target word that has been auto-corrected, and wherein the recipient alert enables the second communication device to access an unmodified version of the target word.

7. The method of claim 1, comprising:
determining device capabilities of the second communication device; and
providing, by the first communication device, a recipient alert with the transmission of the corrected text message to the second communication device responsive to a determination that the second communication device can present the recipient alert at the second communication device, wherein the recipient alert is configured for presentation at the second communication device to indicate the target word that has been auto-corrected, and wherein a format of the recipient alert is selected by one of the first or second communication devices.

8. The method of claim 1, comprising:
receiving, at the first communication device, provisioning information indicating types of alerts to be applied for contact entries stored by the first communication device, wherein the presenting of the correction alert is according to a type of alert of the provisioning information that corresponds to the second communication device.

9. The method of claim 1, comprising:
providing, by the first communication device, a recipient alert with the transmission of the corrected text message to the second communication device, wherein the recipient alert is configured for presentation at the second communication device to indicate the target word that has been auto-corrected; and
providing, by the first communication device, an unmodified version of the target word to the second communication device.

10. The method of claim 1, comprising:
receiving, at the first communication device, provisioning information indicating a level of auto-correction to be applied for the second communication device, wherein the level of auto-correction includes selection from among libraries to be utilized during the auto-correction, wherein the performing of the auto-correction is according to the provisioning information.

11. A non-transitory machine-readable storage device comprising computer instructions which, responsive to being executed by a processor, cause the processor to perform operations comprising:
detecting in a corrected text message an auto-correction of a target word of a group of words, the target word having a type;
detecting an input command at a first communication device requesting a transmission of the corrected text message to a second communication device;
responsive to the detecting of the input command, generating a correction alert for presentation at the first communication device indicating the target word that has been auto-corrected; and
in response to the presenting of the correction alert, generating an option for presentation at the first communication device for modifying the target word,
wherein the transmission of the corrected text message to the second communication device is limited to after the option for modifying is presented at the first communication device, and
wherein a type of the correction alert corresponds to the type of the target word.

12. The non-transitory machine-readable storage device of claim 11, wherein the operations further comprise receiving provisioning information indicating a level of auto-correction to be applied for the second communication device and indicating types of alerts to be applied for contact entries stored by the first communication device, wherein the level of auto-correction includes selection from among libraries to be utilized during the auto-correction, wherein the auto-correction is according to the provisioning information, and wherein the presenting of the correction alert is according to a type of alert of the provisioning information that corresponds to the second communication device.

13. The non-transitory machine-readable storage device of claim 11, wherein the processor is located remotely from the first and second communication devices, wherein the operations further comprise generating a recipient alert configured for presentation at the second communication device to indicate the target word that has been auto-corrected, and wherein the recipient alert enables the second communication device to access an unmodified version of the target word.

14. The non-transitory machine-readable storage device of claim 11, wherein the operations further comprise:
detecting a change in recipients for a message string that includes the corrected text message;
identifying a third communication device from the change; and
accessing provisioning data associated with the third communication device, wherein the provisioning data is received from the third communication device or a remote server storing the provisioning data for the third communication device, wherein the provisioning data includes at least one of rules associated with messages for the third communication device or a dictionary associated with the third communication device.

15. The non-transitory machine-readable storage device of claim 11, wherein the processor includes a group of processors, wherein a first processor of the group of processors is located at the first communication device, and wherein a second processor of the group of processors is located remotely from the first communication device.

16. A method comprising:
  receiving, at a first communication device, provisioning information indicating types of alerts to be applied for contact entries stored by the first communication device;
  detecting, by the first communication device, an auto-correction in a corrected text message of a target word of a group of words, the target word having a type;
  detecting, at the first communication device, an input command requesting a transmission of the corrected text message to a second communication device; and
  responsive to the detecting of the input command, presenting a correction alert at the first communication device indicating the target word that has been auto-corrected, wherein a type of the correction alert corresponds to the type of the target word.

17. The method of claim 16, wherein the presenting of the correction alert is according to a type of alert of the provisioning information that corresponds to the second communication device, and further comprising, in response to the presenting of the correction alert, presenting an option for modifying the target word,
  wherein the transmission of the corrected text message to the second communication device is limited to after the option for modifying is presented at the first communication device.

18. The method of claim 16, wherein the provisioning information indicates a level of auto-correction to be applied for the second communication device, wherein the level of auto-correction includes selection from among libraries to be utilized during the auto-correction, and wherein the auto-correction is according to the provisioning information.

19. The method of claim 16, comprising providing a recipient alert with the transmission of the corrected text message to the second communication device, wherein the recipient alert is configured for presentation at the second communication device to indicate the target word that has been auto-corrected, and wherein the recipient alert enables the second communication device to access an unmodified version of the target word.

20. The method of claim 16, comprising:
  determining device capabilities of the second communication device; and
  providing a recipient alert with the transmission of the corrected text message to the second communication device, wherein the recipient alert is configured for presentation at the second communication device to indicate the target word that has been auto-corrected, and wherein access to an unmodified version of the target word is provided to the second communication device according to the device capabilities of the second communication device.

* * * * *